United States Patent
Niu et al.

(10) Patent No.: US 10,940,595 B2
(45) Date of Patent: Mar. 9, 2021

(54) ROBOT

(71) Applicant: Seiko Epson Corporation, Tokyo (JP)

(72) Inventors: Akio Niu, Matsumoto (JP); Masaru Takahashi, Hamamatsu (JP); Takuya Owa, Shen Zhen (CN); Yoshinobu Goto, Matsumoto (JP)

(73) Assignee: Seiko Epson Corporation

( * ) Notice: Subject to any disclaimer, the term of this patent is extended or adjusted under 35 U.S.C. 154(b) by 114 days.

(21) Appl. No.: 16/142,120

(22) Filed: Sep. 26, 2018

(65) Prior Publication Data

US 2019/0099901 A1  Apr. 4, 2019

(30) Foreign Application Priority Data

Sep. 29, 2017  (JP) .............................. JP2017-192215

(51) Int. Cl.
| | |
|---|---|
| *B25J 17/00* | (2006.01) |
| *B25J 17/02* | (2006.01) |
| *B25J 18/00* | (2006.01) |
| *B25J 19/00* | (2006.01) |
| *B25J 9/12* | (2006.01) |

(52) U.S. Cl.
CPC ........... *B25J 19/0075* (2013.01); *B25J 9/126* (2013.01); *B25J 19/0054* (2013.01); *B25J 19/0079* (2013.01)

(58) Field of Classification Search
CPC . B25J 19/0054; B25J 19/0075; B25J 19/0079
See application file for complete search history.

(56) References Cited

U.S. PATENT DOCUMENTS

| | | | | |
|---|---|---|---|---|
| 4,802,815 A | * | 2/1989 | Funabashi | ................ B25J 9/046 414/680 |
| 6,267,022 B1 | * | 7/2001 | Suzuki | ................ B25J 19/0075 74/490.01 |
| 6,408,710 B1 | | 6/2002 | Kullborg et al. | |
| 9,647,513 B2 | * | 5/2017 | Park | ....................... H02K 7/116 |
| 2005/0126327 A1 | | 6/2005 | Markert et al. | |
| 2013/0255428 A1 | | 10/2013 | Hahakura et al. | |

(Continued)

FOREIGN PATENT DOCUMENTS

| | | |
|---|---|---|
| EP | 1 557 245 A1 | 7/2005 |
| JP | 62-079995 A | 4/1987 |
| JP | H08-168990 A | 7/1996 |

(Continued)

OTHER PUBLICATIONS

Extended European Search Report for Application No. EP 18 19 7158 dated Feb. 21, 2019 (10 pages).

*Primary Examiner* — Jake Cook
(74) *Attorney, Agent, or Firm* — Harness, Dickey & Pierce, P.L.C.

(57) ABSTRACT

A robot includes a robot main body that includes a base and a robot arm connected to the base, a motor that is provided inside the robot main body and drives the robot arm, a control board that is provided inside the robot main body, a power supply board that supplies electric power to the control board, and a drive board that drives the motor based on a command from the control board, and in which the robot main body includes a suction hole from which a pipe to which a suction device for sucking gas inside the robot main body is connected is detachable.

9 Claims, 12 Drawing Sheets

(56) References Cited

U.S. PATENT DOCUMENTS

2013/0345862 A1    12/2013  Schlaich et al.
2014/0067125 A1*   3/2014   Niu ..................... B25J 9/1638
                                                        700/258

FOREIGN PATENT DOCUMENTS

| JP | 2009-160710 A | 7/2009 |
| JP | 2013-212559 A | 10/2013 |
| JP | 2014-240099 A | 12/2014 |
| WO | WO-99-015319 A1 | 4/1999 |

* cited by examiner

ROBOT

BACKGROUND

1. Technical Field

The present invention relates to a robot.

2. Related Art

In the related art, an industrial robot that performs various work on a work target instead of a human being is active. As an example of such an industrial robot, for example, a robot including a base, a robot arm provided so as to be rotatable with respect to the base, and a motor provided inside the robot arm and driving the robot arm is known. In general, a controller provided separately from the robot is connected to such a robot. The robot arm is driven by driving the motor with the controller. With this configuration, the robot can perform various work on the work target.

In recent years, a robot capable of working in a clean room have been developed. For example, a robot in which the interior of a robot arm is airtightly sealed so that the robot can be used under a sterile gas atmosphere is disclosed in JP-A-2013-212559.

However, in such a related are robot, there is a problem that a load is applied to the clean room by heat generated by driving of the robot, or a foreign matter such as dust is generated from various components inside the robot by the driving the robot. For that reason, in the case of using the related art robot in a clean room, extensive facility investment for measures against heat exhaust from the clean room and measures against dust generation caused by driving of the robot was separately needed.

In a case of disposing the robot in the clean room, measures such as placing a controller in a separate environment or putting the controller in a protective box so as not to affect the work environment of the robot were needed. For that reason, there is a problem that a worker has to design how to dispose the robot and the controller, respectively, and a protective box for the controller has to be prepared. For that reason, it takes a lot of time and effort for the worker.

SUMMARY

An advantage of some aspects of the invention is to solve at least a part of the problems described above, and the invention can be implemented as the following configurations.

A robot according to an application example includes a robot main body that includes a base and a robot arm connected to the base, a drive unit that is provided inside the robot main body and drives the robot arm, a control board that is provided inside the robot main body, a power supply board that supplies electric power to the control board, and a drive board that drives the drive unit based on a command from the control board, and in which the robot main body includes a suction hole from which a pipe to which a suction device for sucking gas inside the robot main body is connected is detachable.

According to such a robot, dust existing in the interior (internal space) of the robot main body can be easily discharged by connecting a pipe to the suction hole. Also, since air pressure inside the robot main body can be lowered, heat generated by driving of the robot can be easily discharged. For that reason, it is unnecessary to prepare a large-scale facility investment for heat exhaust measures and dust generation measures, the robot can be stably driven for a long time in a clean room, for example. In addition, since the control board having the controller function and the power supply board, the drive board, and the robot main body are integrated, it is easy to take measures against heat exhaust and measures against dust generation as compared with the case where the controller and the robot main body are separate bodies.

In the robot according to the application example, it is preferable that the base includes the suction hole.

With this configuration, dust in the internal space can be efficiently discharged.

In the robot according to the application example, it is preferable that the robot main body includes metal and the metal is grounded.

With this configuration, it is possible to easily to take measures against static electricity at the robot main body, and therefore, it is possible to reduce or prevent adhesion of dust, a charged foreign matter, and the like to the robot main body.

In the robot according to the application example, it is preferable that the robot arm includes an A-arm and a B-arm that is cantilevered by the A-arm.

With this configuration, it is possible to reduce the volume inside the robot main body portion as compared with the case where the B-arm is supported at both ends and thus, it is possible to more appropriately and easily perform the dust generation measures using the suction hole.

In the robot according to the application example, it is preferable that the robot arm includes a first arm that is rotatably connected to the base, and the drive unit includes a first drive unit that is provided in the first arm and drives the first arm.

With this configuration, for example, in a case where the control board or the like is provided in the base, the first drive unit can be kept away from the control board or the like as compared with a configuration in which the first drive unit is disposed in the base. For that reason, thermal runaway caused by heat generated from the first drive unit and heat generated from the control board can be reduced and thus, the robot can be driven more stably for a longer period of time in a clean room, for example.

In the robot according to the application example, it is preferable that the robot arm includes a second arm that is rotatably connected to the first arm, the drive unit includes a second drive unit that is provided in the second arm and drives the second arm.

With this configuration, heat generated from the first drive unit and the second drive unit can be eliminated more efficiently.

In the robot according to the application example, it is preferable that the drive board includes a first drive board that is provided in the first arm and drives the first drive unit and a second drive board that is provided in the second arm and drives the second drive unit.

With this configuration, connection between the first drive board and the first drive unit and connection between the second drive board and the second drive unit can be made in a simple configuration. Further, heat generated from the first drive board and the second drive board can be eliminated more efficiently.

In the robot according to the application example, it is preferable that the control board is provided in the base.

With this configuration, it is easy to design the layout of various wirings connecting the control board and other portion (for example, drive board). Further, for example, in the case where the suction hole is provided in the base, heat generated from the control board can be eliminated more efficiently.

In the robot according to the application example, it is preferable that the power supply board is provided in the base.

With this configuration, it is easy to design the layout of the various wirings connecting the power supply board and the other portion (for example, drive board). Further, for example, in the case where the suction hole is provided in the base, heat generated from the power supply board can be eliminated more efficiently.

In the robot according to the application example, it is preferable that a fan is not provided in the robot main body.

With this configuration, measures against dust generation are particularly easy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot according to the invention will be described in detail based on preferred embodiments illustrated in the accompanying drawings.

First Embodiment

Basic Configuration of Robot

Figure 1:
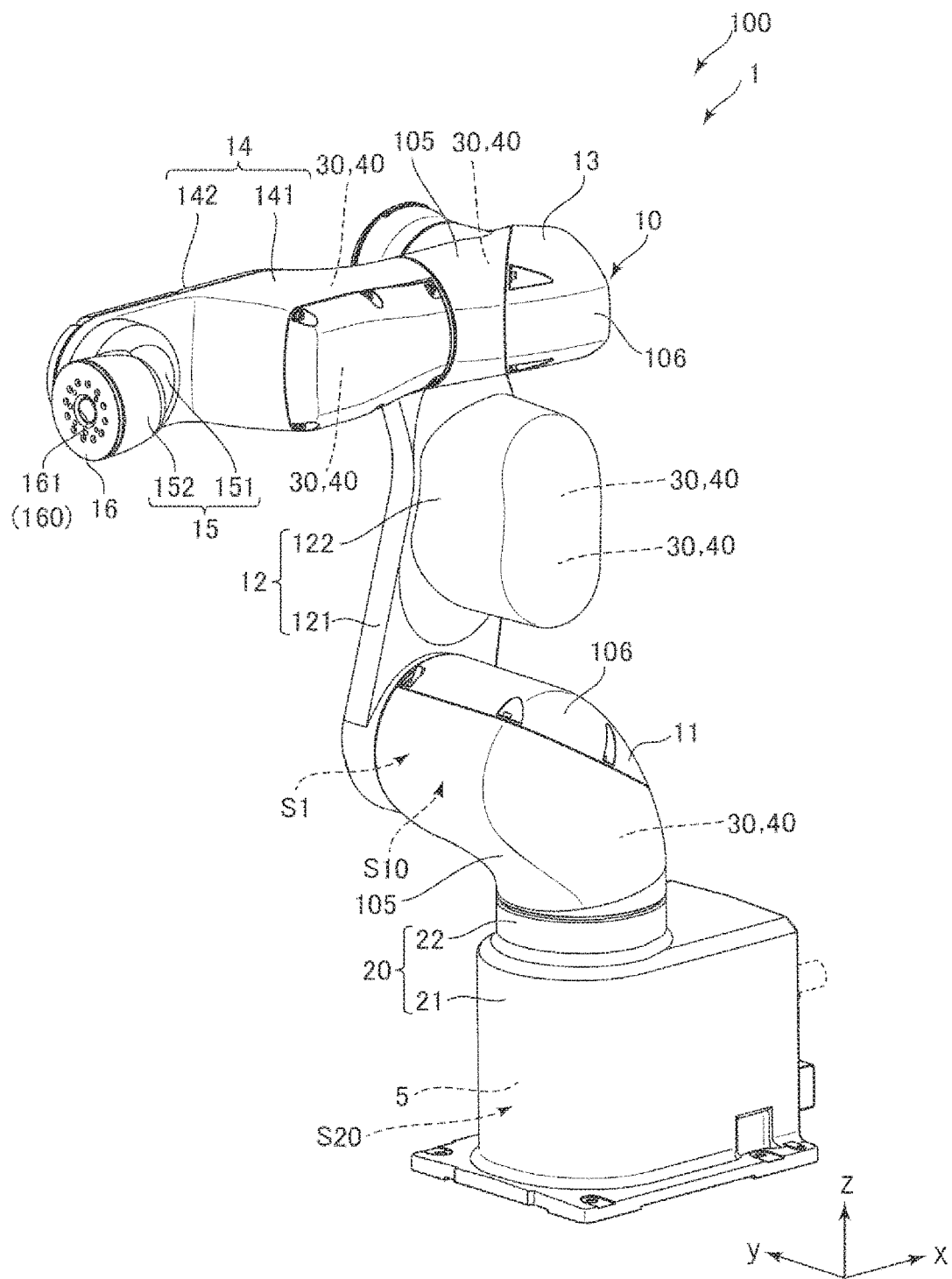
FIG. 1 is a perspective view illustrating a robot according to a first embodiment.
Figure 2:
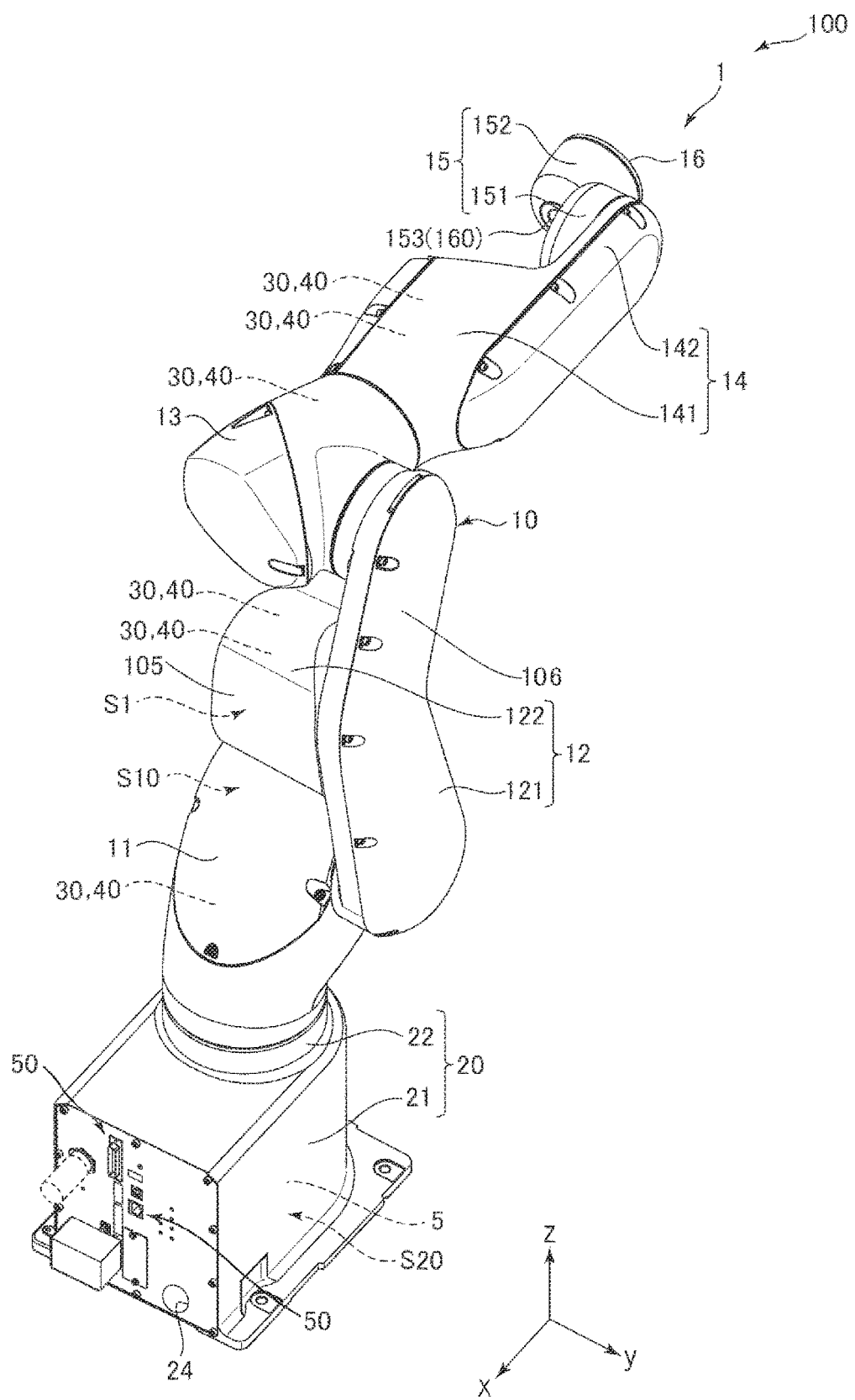
FIG. 2 is a perspective view of the robot illustrated in FIG. 1 as viewed from a direction different from that in FIG. 1.
Figure 3:
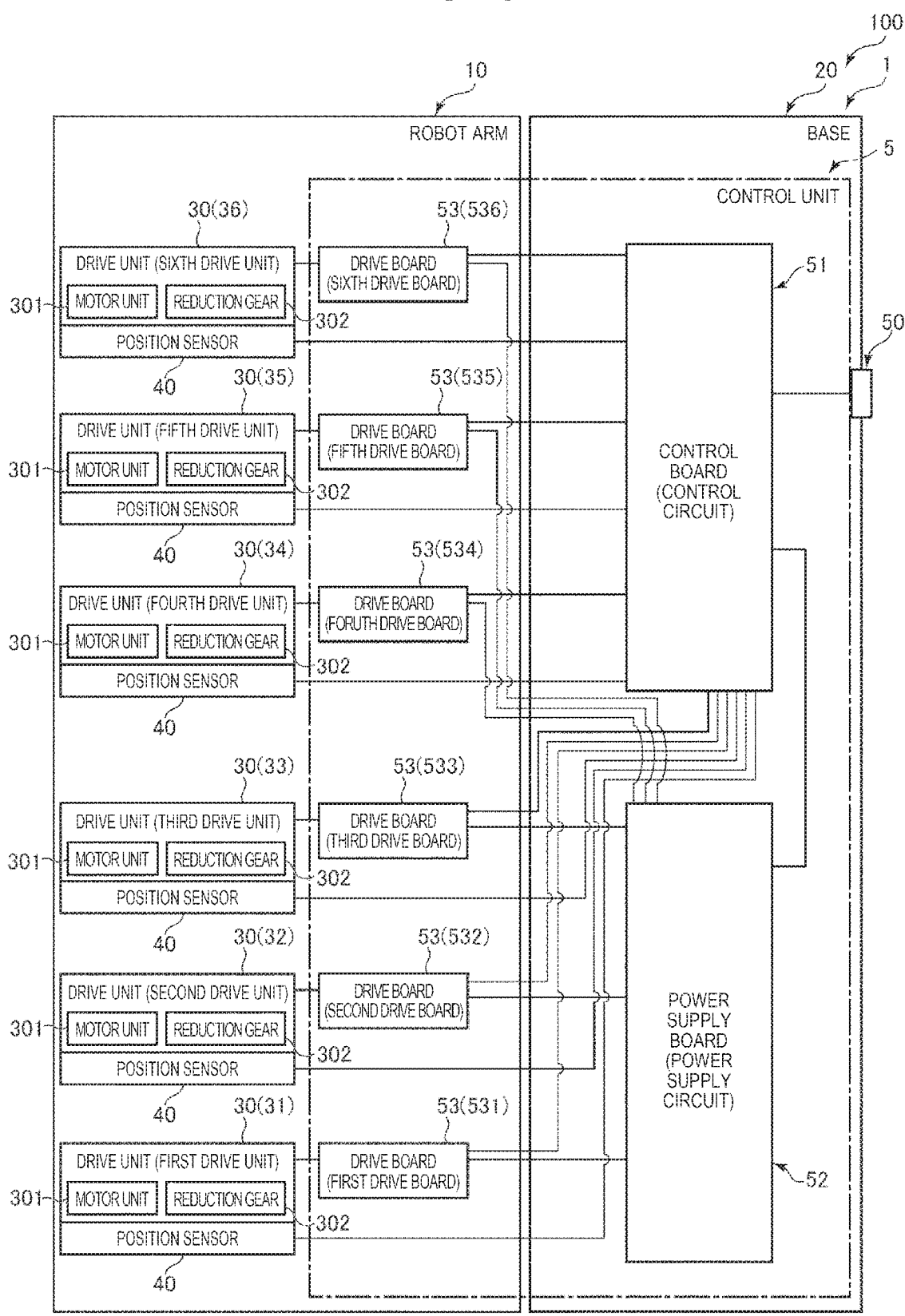
FIG. 3 is a system block diagram of the robot illustrated in FIG. 1.
Figure 4:
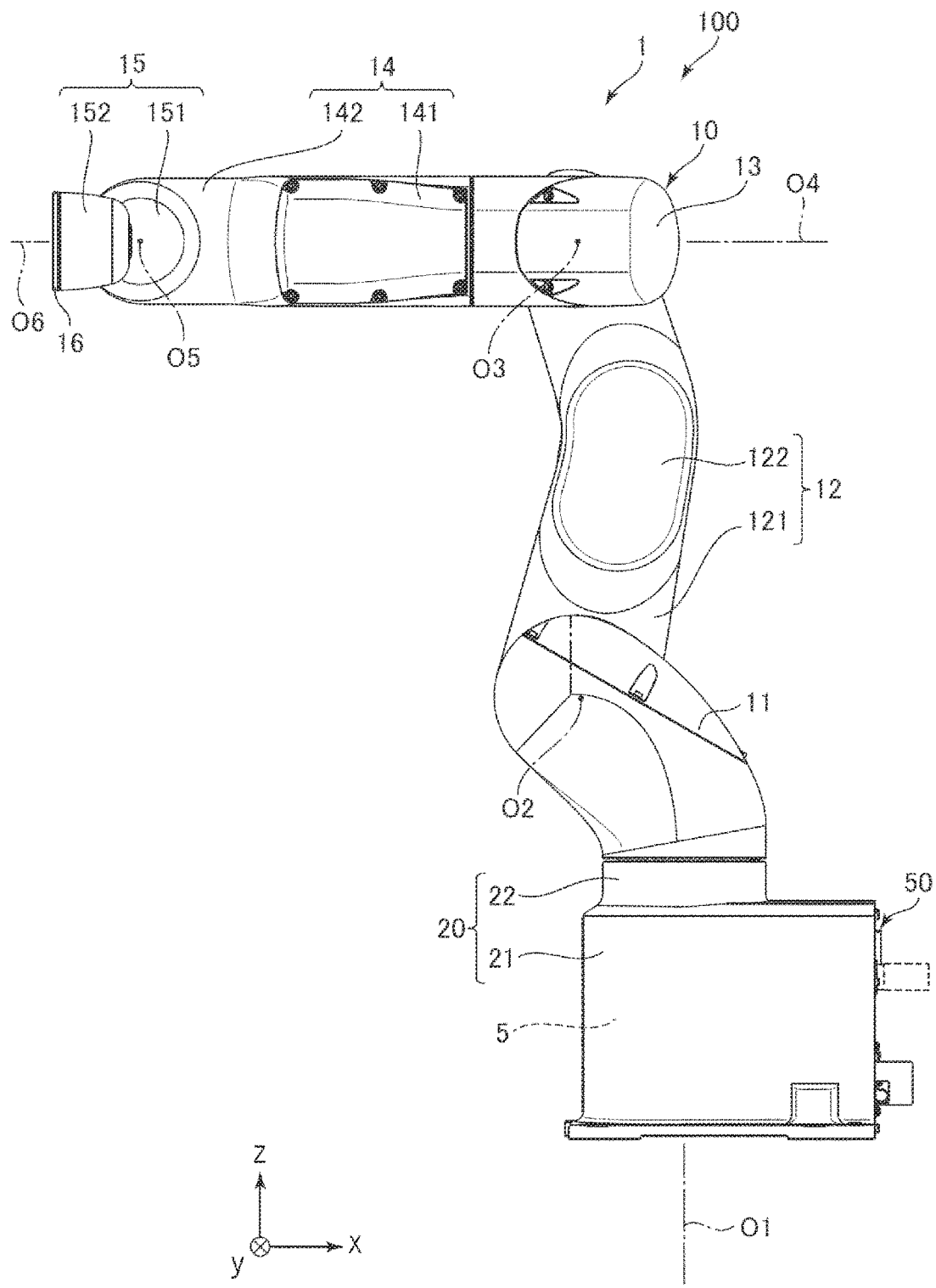
FIG. 4 is a diagram of the robot illustrated in FIG. 1 as viewed from the −y axis side.
Figure 5:
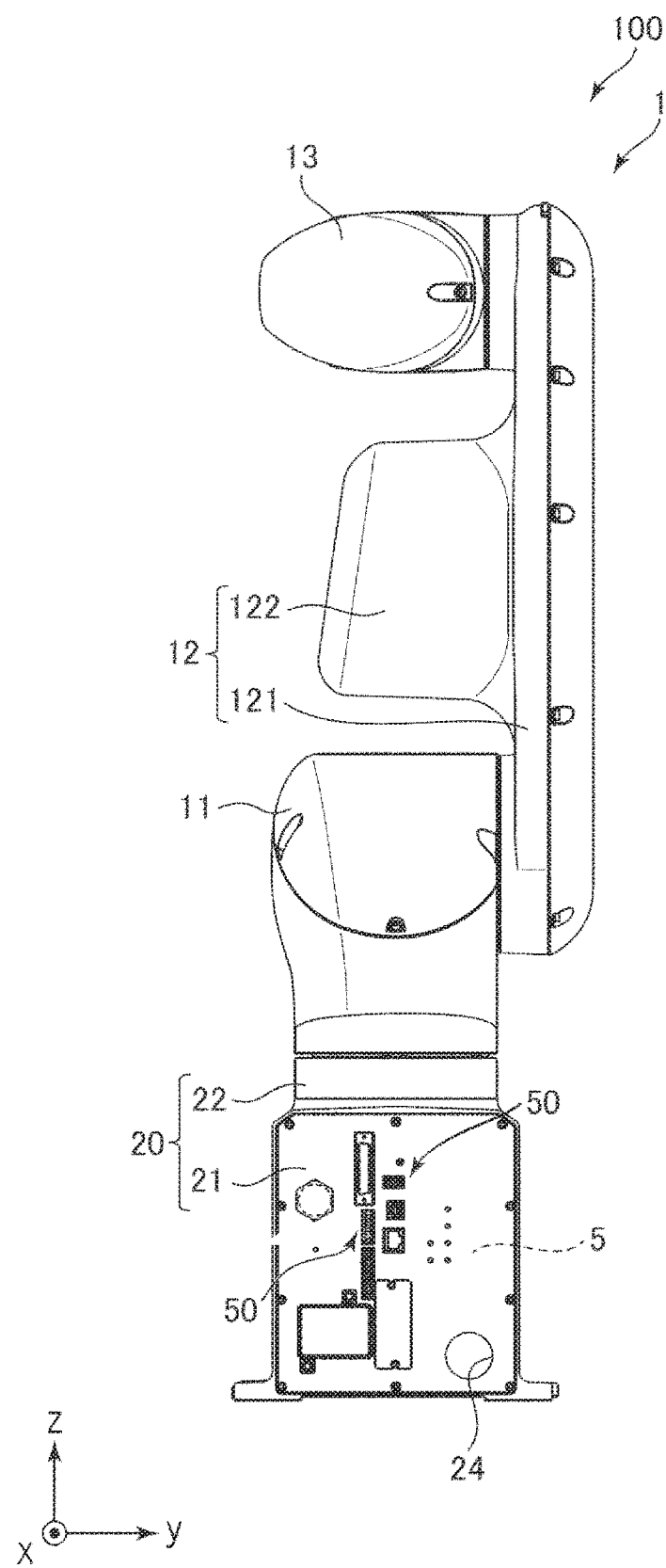
FIG. 5 is a diagram of the robot illustrated in FIG. 1 as viewed from the +x axis side.
Figure 6:
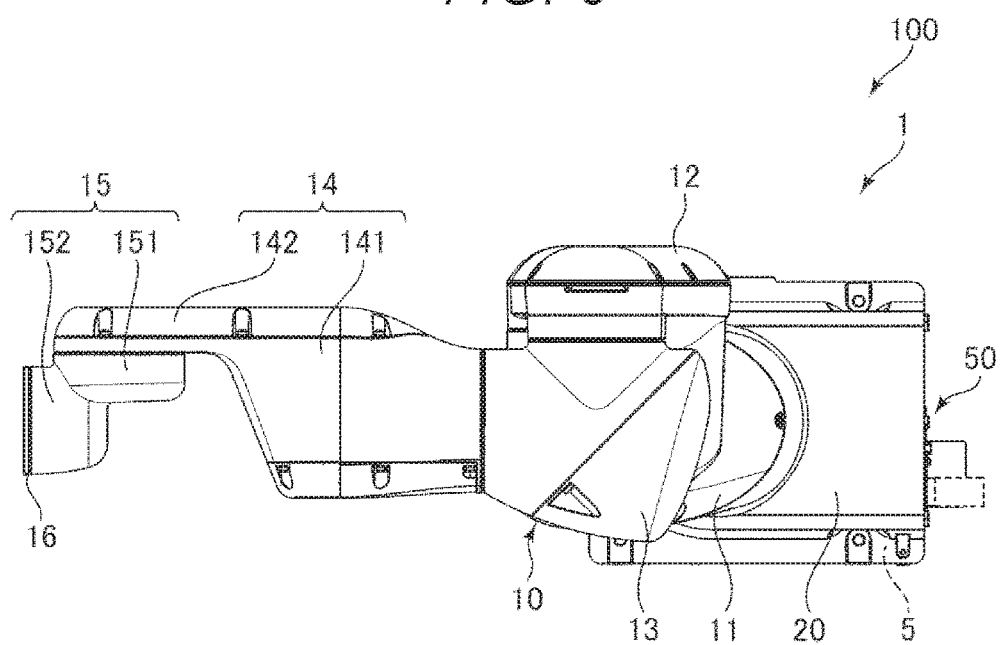
FIG. 6 is a diagram of the robot illustrated in FIG. 1 as viewed from the +z axis side.
Figure 6:
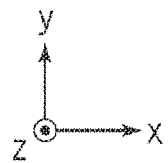
Figure 7:
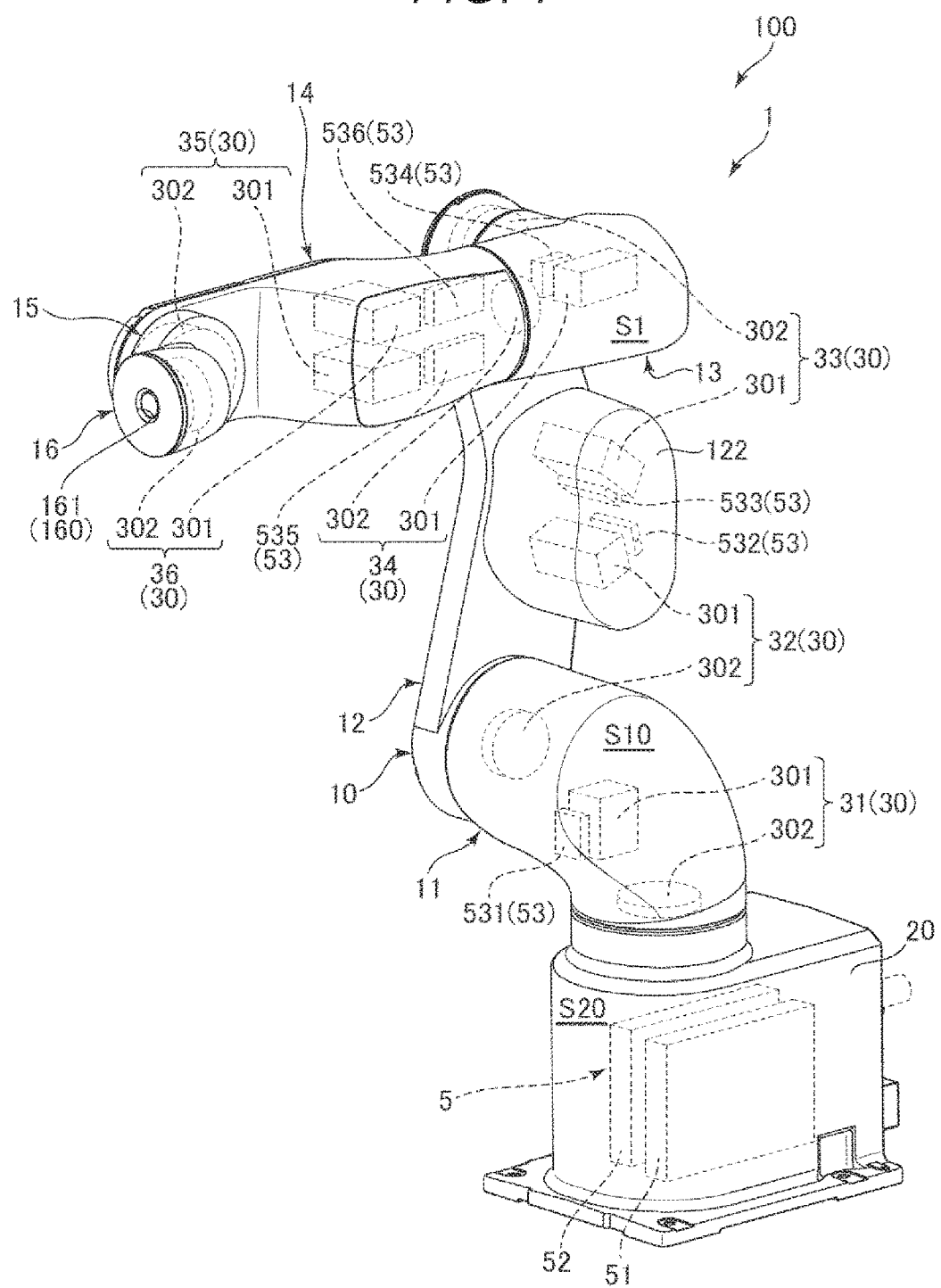
FIG. 7 is a perspective view schematically illustrating the inside of a robot main body included in the robot illustrated in FIG. 1.
Figure 8:
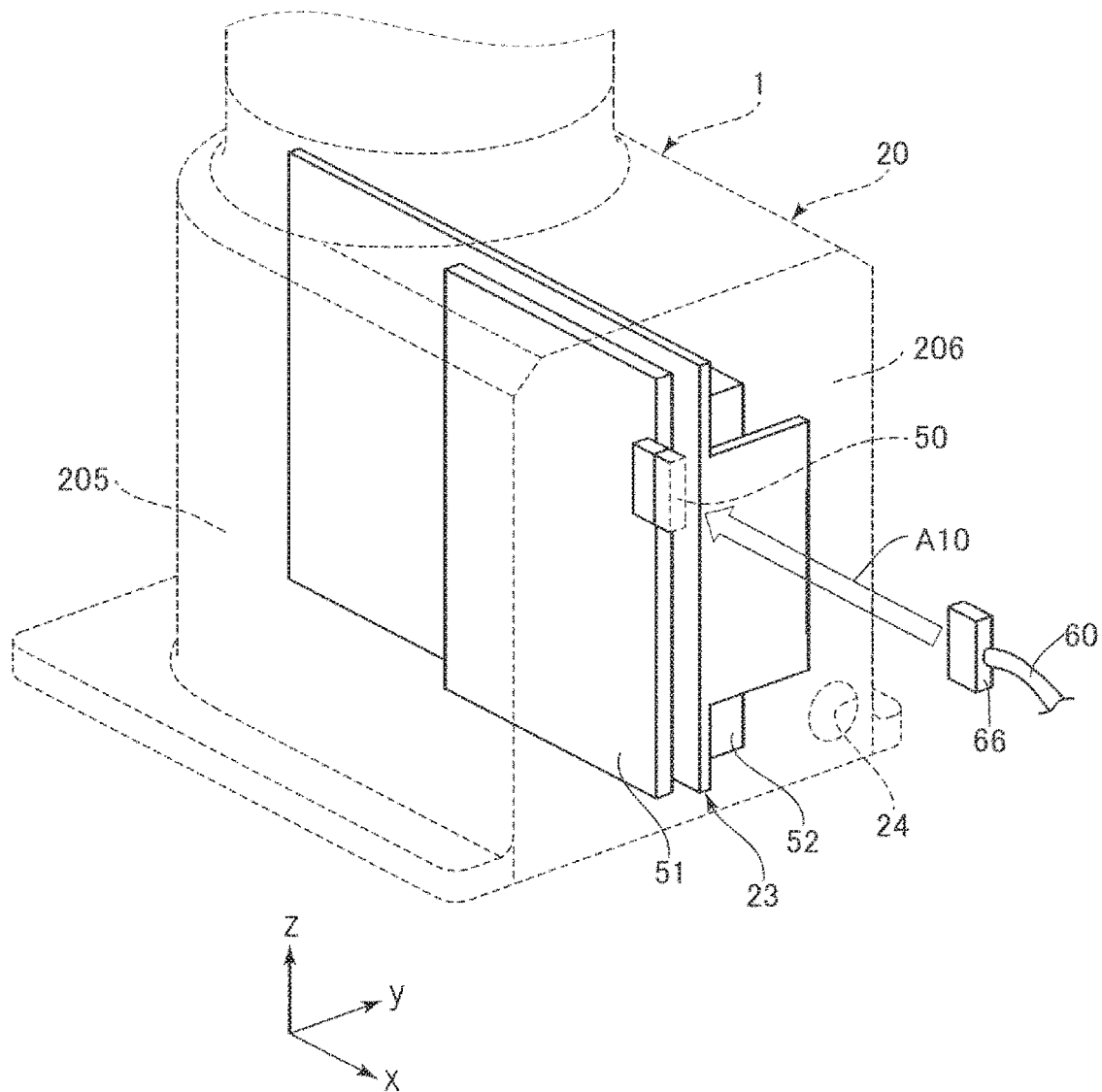
FIG. 8 is a perspective view schematically illustrating the inside of the base of the robot.

FIG. 1 is a perspective view illustrating a robot according to a first embodiment. FIG. 2 is a perspective view of the robot illustrated in FIG. 1 as viewed from a direction different from that in FIG. 1. FIG. 3 is a system block diagram of the robot illustrated in FIG. 1. FIG. 4 is a diagram of the robot illustrated in FIG. 1 as viewed from the −y axis side. FIG. 5 is a diagram of the robot illustrated in FIG. 1 as viewed from the +x axis side. FIG. 6 is a diagram of the robot illustrated in FIG. 1 as viewed from the +z axis side. FIG. 7 is a perspective view schematically illustrating the inside of a robot main body included in the robot illustrated in FIG. 1. FIG. 8 is a perspective view schematically illustrating the inside of the base of the robot. For convenience of explanation, in each of FIGS. 1, 2, and 4 to 7, x, y, and z axes are illustrated as three axes orthogonal to each other, and the tip end side of the arrow indicating each axis is defined as "+", and the base end side thereof is defined as "−". Also, a direction parallel to the x axis is referred to as the "x axis direction", a direction parallel to the y axis is referred to as the "y axis direction", and a direction parallel to the z axis is referred to as "z axis direction". The base 20 side of a robot 100 illustrated in FIG. 1 is referred to as a "base end", and the opposite side (arm 16 side) is referred to as a "tip end". The upper side in FIG. 4 is referred to as "upper" and the lower side is referred to as "lower". Further, the up-and-down direction in FIG. 4 is defined as the "vertical direction", and the right-and-left direction is defined as the "horizontal direction".

Also, in this specification, the term "horizontal" includes a case where it is inclined within a range of ±5 degrees or less with respect to the horizontal. Similarly, the term "vertical" includes a case where it is inclined within a range of ±5 degrees or less with respect to the vertical. Also, the term "parallel" includes not only a case where two lines (including axes) or planes are perfectly parallel to each other but also a case where two lines (including axes) or planes are inclined within ±5 degrees. The term "orthogonal" includes not only a case where two lines (including axes) or a plane intersects each other at an angle of 90 degrees but also a case where it is inclined within ±5 degrees with respect to 90 degrees.

The robot 100 illustrated in FIGS. 1 and 2 is a so-called six axis vertical articulated robot.

This robot 100 can be used, for example, in a manufacturing process for manufacturing a precision instrument such as a wristwatch. The robot 100 can be appropriately used in an environment with high cleanliness. The robot 100 can be particularly appropriately used under the environment of the cleanliness class of Class 3 or more based on the international unified standard (ISO) 14644-1: 2015.

In the following, the basic configuration of the robot 100 will be described.

The robot 100 includes a robot main body 1, a plurality of drive units 30, a position sensor 40, and a control unit 5 (control device) built in the robot main body 1 (see FIGS. 1 to 3). The robot 100 includes a suction hole 24 used for sucking gas (air) inside the robot 100 (see FIG. 2). Further, the robot 100 includes a plurality of external connection portions 50 (for example, connectors and the like) (see FIG. 2). For example, power is supplied to the robot 100 by electrically connecting the external connection portion 50 to an external power supply (not illustrated) and as a result, the robot 100 can be driven.

In this specification, the orientation of the robot 100 illustrated in FIG. 1 (the same orientation in FIGS. 2 and 4 to 7) is referred to as "basic orientation". In addition, for convenience of explanation, unless otherwise mentioned, in the description on a disposition relationship of the respective portions of the robot 100, description will be made based on the robot 100 in a state of being stationary in the basic orientation.

Robot Main Body

As illustrated in FIGS. 1 and 2, the robot main body 1 includes a base 20 and a robot arm 10 connected to the base 20. As will be described later in detail, the robot main body 1 is configured to include a plurality of exterior members (plurality of housings 105 and a plurality of covers 106, and the like), and includes an internal space S1 accommodating a plurality of drive units 30, a plurality of position sensors 40 and the control unit 5. The internal space S1 includes the inside of the base 20, that is, internal space S20 and the inside of the robot arm 10, that is, the internal space S10, and the internal space S10 and the internal space S20 communicate with each other.

In the following, respective portions of the robot main body 1 will be described below.

Base

The Base 20 is a portion for attaching the robot 100 to any installation place. The installation place of the base 20 is not particularly limited, and may be, for example, a floor, a wall, a ceiling, a work stand, a movable carriage, and the like. The base 20 includes a main body 21 having a rectangular parallelepiped outer shape and a protruding port ion 22 provided on the +z axis side of the main body 21 and having a columnar outer shape.

Robot Arm

The robot arm 10 is rotatably supported on the base 20, and includes an arm 11 (first arm), an arm 12 (second arm), an arm 13 (third arm), an arm 14 (fourth arm), an arm 15 (fifth arm), and an arm 16 (sixth arm, tip end arm). These arms 11 to 16 are connected in this order from the base end side to the tip end side, and are configured so as to be rotatable relative to the adjacent base end side arm or base 20. Although not illustrated in detail, in the embodiment, each of the arms 11 to 16 is provided with an exterior member (housing 105, cover 106, and the like), and a support member (not illustrated) provided on the inner peripheral surface of the exterior member and including a bearing (not illustrated) connected to the drive unit 30.

As illustrated in FIG. 4, the arm 11 is connected to the protruding portion 22 of the base 20, and is rotatable around the rotation axis O1 along the vertical direction with respect to the base 20. The arm 11 has a shape extending obliquely upward from the base 20 and the tip end portion of the arm 11 protrudes outward from the base 20 as viewed from the z axis direction.

As illustrated in FIGS. 4 and 5, the arm 12 is connected to a portion on the +y axis side of the tip end portion of the arm 11, and is rotatably movable with respect to the arm 11 around a rotation axis O2 along a horizontal direction. The arm 12 has a longitudinal shape in which the central portion is bent as viewed from the y axis direction, and includes a flat portion 121 having a shape extending from the arm 11 toward the arm 13 and a protruding portion 121 protruding from the central portion of the flat portion 121 toward the −y axis direction. The protruding portion 122 is separated from the arm 11 so as not to contact the arm 11 even when the arm 12 rotates.

As illustrated in FIGS. 4, 5, and 6, the arm 13 is connected to a surface (portion) on the same −y axis side as the surface of the flat portion 121 on which the arm 11 is provided and is rotatable around a rotation axis O3 along the horizontal direction with respect to the arm 12. The arm 13 has a shape protruding from the arm 12 in the −y axis direction. In addition, the arm 13 is connected to the arm 12 so as not to contact the protruding portion 122.

As illustrated in FIG. 4, the arm 14 is connected to the tip end portion of the arm 13 and is rotatable around a rotation axis O4 orthogonal to the rotation axis O3 with respect to the arm 13. As illustrated in FIG. 6, the arm 14 has a shape extending in the −x axis direction from the arm 13, and the length (width) of the arm 14 in the y axis direction gradually decreases in the +y axis direction (one side in the width direction of the arm 14) while orienting from the base end side to the tip end side in the middle. Such an arm 14 includes a base end side portion 141 and a tip end side portion 142 whose length in the y axis direction is shorter than that of the base end side portion 141.

As illustrated in FIG. 4, the arm 15 is connected to the −y axis side portion of the tip end side portion 142, and is rotatable around the rotation axis O5 orthogonal to the rotation axis O4 with respect to the arm 14. As illustrated in FIGS. 4 and 6, the arm 15 includes a first portion 151 protruding from the tip end portion of the arm 14 in the −y axis direction and a second portion 152 connected to the first portion 151. The outer shape of the first portion 151 is a columnar shape. On the other hand, the outer shape of the second portion 152 is cylindrical and has a hole 153 penetrating along the x axis direction (see FIG. 2). As illustrated in FIG. 6, the portion on the +y axis side of the center line of the second portion 152 is connected to the base end portion of the first portion 151. In the embodiment, the first portion 151 and the second portion 152 are integrally formed.

As illustrated in FIG. 4, the arm 16 is connected to the base end portion of the arm 15, and is rotatable around the rotation axis O6 orthogonal to the rotation axis O5 with respect to the arm 15. The arm 16 is in the shape of a disk and includes a hole 161 penetrating along the x axis direction in the center portion thereof (see FIG. 1). The hole 161 communicates with the hole 153 of the second portion 152 of the arm 15, and the hole 161 and the hole 153 constitute a through-hole 160 (see FIGS. 1 and 2). Although not illustrated, such an arm 16 is configured so as to be able to allow attachment of an end effector for performing various work such as gripping, for example, on a work target. In this case, wiring (not illustrated) for transmitting the driving force to the end effector can be inserted through the through-hole 160. For example, the arm 16 may be configured such that a force detection device (force sensor), although not illustrated, for detecting a force (including moment) applied to the end effector can be attached. In this case, it is preferable to provide the force detection device between the end effector and the arm 16.

As described above, the robot 100 including the robot main body 1 having such a configuration is a vertical articulated robot including six (plural) arms 11 to 16. That is, the robot 100 has six rotation axes O1 to O6, and is a robot with six degrees of freedom. For that reason, the driving range of the tip end portion of the robot arm 10 is wide, so that high workability can be exhibited. In the embodiment, the number of arms included in the robot 100 is six, but the number of arms may be one to five, or may be seven or more. However, in order to precisely position the end effector provided at the tip end of the robot arm 10 at the intended place in three-dimensional space, it is preferable that the number of arms (number of rotation axes) is at least six.

As described above, the arm 12 is connected to a portion on the +y axis side of the tip end portion of the arm 11. As such, the arm 12 is not configured to be supported at both ends as sandwiched by the arm 11, but is cantilevered by the arm 11. That is, the robot arm 10 includes the arm 11 (A-arm) and the arm 12 (B-arm) is cantilevered by the arm 11 (A-arm).

With this configuration, as compared with a case where the arm 12 is supported at both ends by the arm 11, the configuration of the arms 11, 12 can be simplified and the cost can be reduced.

Furthermore, as described above, the arm 15 is connected to a portion on the −y axis side of the portion 142. As such, the arm 15 is not configured to be supported at both ends by the arm 14, but is cantilevered by the arm 14. That is, the robot arm 10 includes the arm 14 (A-arm) and the arm 15 (B-arm) is cantilevered by the arm 14 (A-arm).

With this configuration, as compared with the case where the arm 15 is supported at both ends by the arm 14, the configuration of the arms 14, 15 can be simplified and the cost can be reduced.

As such, in the first embodiment, there are a plurality (two) of cantilever-supported "B-arms". For that reason, the configuration of the robot arm 10 can be simplified, and the cost can be greatly reduced.

In the first embodiment, the volume of the inside of the base 20 is equal to or smaller than the volume of the robot arm 10. For that reason, the degree of freedom of installation of the base 20 can be increased.

Drive Unit

As illustrated in FIG. 3, the robot 100 includes the same number (six in the embodiment) of drive units 30 as the arms 11 to 16. Each of the plurality of drive units 30 has a function of rotating the corresponding arm with respect to the arm (or base 20) positioned on the base end side thereof, and includes a motor unit 301 including a motor as a power supply and a brake, a power transmission mechanism (not illustrated) including a reduction gear 302, a belt (not illustrated), a pulley (not illustrated), and the like.

In the first embodiment, one drive unit 30 is responsible for driving one arm. Accordingly, the robot 100 includes a first drive unit 31 for driving the arm 11, a second drive unit 32 for driving the arm 12, a third drive unit 33 for driving the arm 13, a fourth drive unit 34 for driving the arm 14, a fifth drive unit 35 for driving the arm 15, and a sixth drive unit 36 for driving the arm 16. In the following description, when the first drive unit 31, the second drive unit 32, the third drive unit 33, the fourth drive unit 34, the fifth drive unit 35, and the sixth drive unit 36 are not distinguished from each other, these drive units are respectively referred to as the drive unit 30.

As illustrated in FIG. 7, each of the motor unit 301 and the reduction gear 302 included in the first drive unit 31 is provided in the arm 11. Although not illustrated in detail, the first drive unit 31 includes a first pulley (not illustrated) connected to the shaft portion of the motor unit 301, a second pulley (not illustrated) disposed to be spaced apart from the first pulley and connected to the shaft portion of the reduction gear 302, and a belt (not illustrated) wound around the first pulley and the second pulley. The second pulley is connected to a bearing (not illustrated) included in the arm 11. With this configuration, the arm 11 is rotatable by being driven by the first drive unit 31. Matters substantially the same as those described above of the are applied to the second drive unit 32, the third drive unit 33, the fourth drive unit 34, the fifth drive unit 35, and the sixth drive unit 36, which will be described later, and the corresponding arm is driven through so-called belt drive.

As illustrated in FIG. 7, the motor unit 301 included in the second drive unit 32 is provided in the protruding portion 122, and the reduction gear 302 of the second drive unit 32 is provided at a connection portion between the arm 12 and the arm 11 (joint portion). The motor unit 301 included in the third drive unit 33 is provided in the protruding portion 122, and the reduction gear 302 included in the third drive unit 33 is provided at a connection portion (joint portion) between the arm 12 and the arm 13. Each of the motor unit 301 and the reduction gear 302 included in the fourth drive unit 34 is provided in the arm 13. The motor unit 301 included in the fifth drive unit 35 is provided in the base end side portion 141 on the base end side of the arm 14 and the reduction gear 302 included in the fifth drive unit 35 is provided in the first portion 151 of the arm 15. The motor unit 301 included in the sixth drive unit 36 is provided in the base end side portion 141 on the base end side of the arm 14 and the reduction gear 302 included in the sixth drive unit 36 is provided in the second portion 152 of the arm 15 (see FIG. 7). Although not illustrated, the sixth drive unit 36 includes a conversion mechanism for converting the transmission direction of the driving force of a bevel gear or the like by 90 degrees.

Position Sensor

As illustrated in FIG. 3, the robot 100 includes the same number of position sensors 40 as that of the drive units 30, and one position sensor 40 (angle sensor) is provided for one drive unit 30. The position sensor 40 detects a rotation angle of the rotation shaft (shaft portion) of the motor unit 301 (specifically, the motor) or the reduction gear 302. With this configuration, it is possible to obtain information such as an angle (orientation) of the arm on the tip end side with respect to the arm on the base end side. As each of these position sensors 40, for example, a rotary encoder or the like can be used. Each position sensor 40 is electrically connected to a control board 51 of the control unit 5 to be described later.

Control Unit

As illustrated in FIG. 3, the control unit 5 includes the control board 51, a power supply board 52 for supplying electric power to the control board 51, a plurality of drive boards 53 for driving the respective drive units 30 based on a command from the control board 51. The control board 51 and the power supply board 52 constitute a control device (controller) that supplies electric power for driving the robot 100 and controls driving of the robot 100.

Control Board

As illustrated in FIG. 7, the control board 51 is provided in the internal space S20 and includes a control circuit (not illustrated) for controlling driving of the robot 100. The control circuit includes a processor such as a central processing unit (CPU), a volatile memory such as a random access memory (RAM), a nonvolatile memory such as a read only memory (ROM), and the like, and performs control of driving of each portion of the robot 100 and processing such as various operations and determinations. For example, the control circuit is capable of executing a predetermined control program, and outputs a control signal to each drive board 53 according to the control program so as to cause the robot 100 (specifically, the robot arm 10) to execute a predetermined operation.

Power Supply Board

As illustrated in FIG. 7, the power supply board 52 is provided in the internal space S20, and includes a power supply circuit (not illustrated) for generating electric power to be supplied to the control board 51 and each drive board 53. The power supply circuit includes a transformer and a noise filter, converts the frequency and voltage of power supplied from an external power supply (not illustrated) such as a commercial power supply, and supplies the converted frequency and voltage to the control board 51 and each drive board 53. In particular, in the embodiment, the power supply circuit is provided with a converter for converting an AC voltage output from the external power supply into a DC voltage (drive voltage) of 52 V and outputting the DC voltage (drive voltage) to each drive board 53 or the like.

As illustrated in FIG. 8, the control board 51 and the power supply board 52 described above are respectively supported by support members 23 made of sheet metal or the like. The control board 51 is attached to the surface on the −y axis side of the support member 23, for example, by screwing or the like, and the power supply board 52 is attached to the surface on the +y axis side of the support member 23 by, for example, screwing. Further, the support member 23 can be attached to and detached from the base 20. Accordingly, the control board 51 and the power supply board 52 can be taken out together with the support member 23 to the outside of the base 20. With this configuration, for example, maintenance of the control board 51 and the power supply board 52 can be easily performed.

Drive Board

As illustrated in FIG. 7, each of the drive boards 53 is distributed and disposed in the internal space S10, and includes a drive circuit (not illustrated) that receives a control signal from the control board 51 and converts (generates) electric power into electric power to be supplied to the drive unit 30. The drive circuit includes, for example, an inverter circuit that converts DC power (current) to AC power (current).

In the embodiment, one drive board 53 is provided for one drive unit 30, and the drive board 53 corresponding to each drive unit 30 performs conversion (generation) of electric power to be supplied to the drive unit 30. Accordingly, the robot 100 includes a first drive board 531 corresponding to the first drive unit 31, a second drive board 532 corresponding to the second drive unit 32, a third drive board 533 corresponding to the third drive unit 33, a fourth drive board 534 corresponding to the fourth drive unit 34, a fifth drive board 535 corresponding to the fifth drive unit 35, and a sixth drive board 536 corresponding to the sixth drive unit 36. In the following description, in a case where the first drive board 531, the second drive board 532, the third drive board 533, the fourth drive board 534, the fifth drive board 535, and the sixth drive board 536 are not distinguished from each other, these boards are respectively referred to as the drive board 53.

As illustrated in FIG. 7, the first drive board 531 is provided in the arm 11, and is provided in the vicinity of the motor unit 301 included in the first drive unit 31. The second drive board 532 is provided in the protruding portion 122 of the arm 12 and is provided in the vicinity of the motor unit 301 included in the second drive unit 32. The third drive board 533 is provided in the protruding portion 122 of the arm 12 and is provided in the vicinity of the motor unit 301 included in the third drive unit 33. The fourth drive unit 534 is provided in the arm 13 and is provided in the vicinity of the motor unit 301 included in the fourth drive unit 34. The fifth drive board 535 is provided in the arm 14 and is provided in the vicinity of the motor unit 301 included in the fifth drive unit 35. The sixth drive board 536 is provided in the arm 14 and is provided in the vicinity of the motor unit 301 included in the sixth drive unit 36.

External Connection Portion

As illustrated in FIGS. 2 and 4, the base 20 is provided with a plurality of external connection portions 50 constituted by, for example, connectors. The external connection portion 50 is attached to the base 20 so that a portion thereof it is exposed to the outside (see FIG. 8), and is electrically connected to the control board 51 and the power supply board 52. The external connection portion 50 is a component for connecting a plug 66 (connected portion) of the external cable 60 connected to, for example, an external power supply (not illustrated) or the like. That is, the external connection portion 50 is a component for performing electrical connection between the robot 100 and external power supplies, various devices, and the like.

As a specific example of such an external connection portion 50, for example, a power supply connector for connecting an external power plug electrically connected to an external power supply, a connector for inputting and outputting signals to and from various devices such as a teaching pendant used by a worker to give an operation instruction to the robot 100, a connector for outputting a signal to an end effector, and a connector for inputting and outputting data relating to a control program, and the like may be included.

Power can be supplied to the robot 100 and the robot 100 can be driven by connecting the plug 66 to such an external connection portion 50. For example, the plug 66 illustrated in FIG. 8 may be moved in the direction of the arrow A10 and the plug 66 (connected portion) may be connected to the external connection portion 50.

The basic configuration of the robot 100 has been described as above. As described above, the control unit 5 having the function of the controller is accommodated inside the robot main body 1, that is, in the internal space S1. That is, the robot 100 includes the control board 51 and the power supply board 52 for supplying electric power to the control board 51, which are provided in the internal space S1. Furthermore, the robot 100 includes the drive board 53 (a plurality of drive boards in the first embodiment) that drives the drive unit 30 based on a command from the control board 51.

With this configuration, since the controller and the robot main body 1 are integrated, it is not necessary to consider each disposition of the controller and the robot main body 1 unlike the related art, and the degree of freedom of disposition of the robot 100 can be increased. Further, as compared with the case where the controller is a separate body, it is possible to reduce the total installation area and to save time and effort such as connection to the controller.

As described above, the control board 51 is provided in the base 20. With this configuration, it is easy to design the disposition of various wirings (not illustrated) for connecting the control board 51 and each drive board 53.

Furthermore, as described above, the power supply board 52 is provided in the base 20.

With this configuration, it is easy to design the disposition of various wirings (not illustrated) for connecting the power supply board 52 and each drive board 53. As compared with the case where the control board 51 and the power supply board 52 are provided in the robot arm 10, the control board 51 and the power supply board 52 can be stably disposed, and it is also possible to prevent an increase in load capacity of the tip end portion of the robot arm 10.

As described above, the robot arm 10 includes the arm 11 (first arm) rotatably connected to the base 20, and the first drive unit 31 for driving the arm 11 is provided in the arm 11.

With this configuration, the first drive unit 31 can be moved away from the control board 51 and the like provided in the base 20, as compared with the configuration in which the first drive unit 31 is disposed in the base 20. For that reason, it is possible to reduce thermal runaway caused by heat generated from the first drive unit 31 and heat generated from the control board 51 and the like, so that the robot 100 can be stably driven for a long time.

Furthermore, as described above, the robot arm 10 includes the arm 12 (second arm) rotatably connected to the arm 11 (first arm), and the second drive unit 32 for driving the arm 12 is provided in the arm 12.

With this configuration, heat generated from the first drive unit 31 and the second drive unit 32 can be eliminated more efficiently.

The robot arm 10 includes the plurality of arms 11 to 16 connected to each other, and the plurality of drive units 30 for independently driving the plurality of arms 11 to 16 are provided inside the robot arm 10. Then, the plurality of drive units 30 are dispersedly provided in the robot arm 10 (see FIG. 7).

With this configuration, thermal runaway can be reduced by dispersedly disposing the drive units 30, and thus the robot 100 can be stably driven for a long time.

The disposition of the plurality of drive units 30 is not limited to the illustrated disposition. The "dispersion" described above includes not only that all of the plurality of drive units 30 are arranged separately but also that the plurality of drive units 30 are disposed in at least two groups.

In addition, as described above, the first drive board 531 for driving the first drive unit 31 is provided in the arm 11 (first arm) and the second drive board 531 for driving the second drive unit 32 is provided in the arm 12 (second arm).

With this configuration, the connection between the first drive board 531 and the first drive unit 31 and the connection between the second drive board 532 and the second drive unit 32 can be made in a simple configuration. Since heat generated from the first drive board 531 and the second drive board 532 can be dispersed, the robot 100 can be stably driven for a long time.

Furthermore, as described above, the plurality of drive boards 53 for independently driving the plurality of drive units 30, respectively, are provided in the robot arm 10. Then, the plurality of drive boards 53 are dispersedly provided in the robot arm 10.

With this configuration, it is possible to simplify connection between the drive board 53 and the corresponding drive unit 30, for example, as compared with a configuration in which the plurality of drive units 30 are driven by one drive board 53. Since the plurality of drive boards 53 are dispersedly provided, heat generated from the drive board 53 can be dispersed and thus, the robot 100 can be stably driven for a long time.

In particular, as illustrated in the drawing, it is preferable that each drive board 53 is provided in the vicinity of the corresponding drive unit 30. With this configuration, it is possible to remarkably reduce the number of wirings of a power supply system and the number of wirings of a signal system, as compared with the case where the plurality of drive boards 53 are disposed collectively in the base 20.

The disposition of the plurality of drive boards 53 is not limited to the illustrated disposition. The "dispersion" described above includes not only that all of the plurality of drive boards 53 are disposed separately but also that the plurality of drive boards 53 are disposed in at least two groups.

Exterior Member and Suction Hole of Robot

Figure 9:
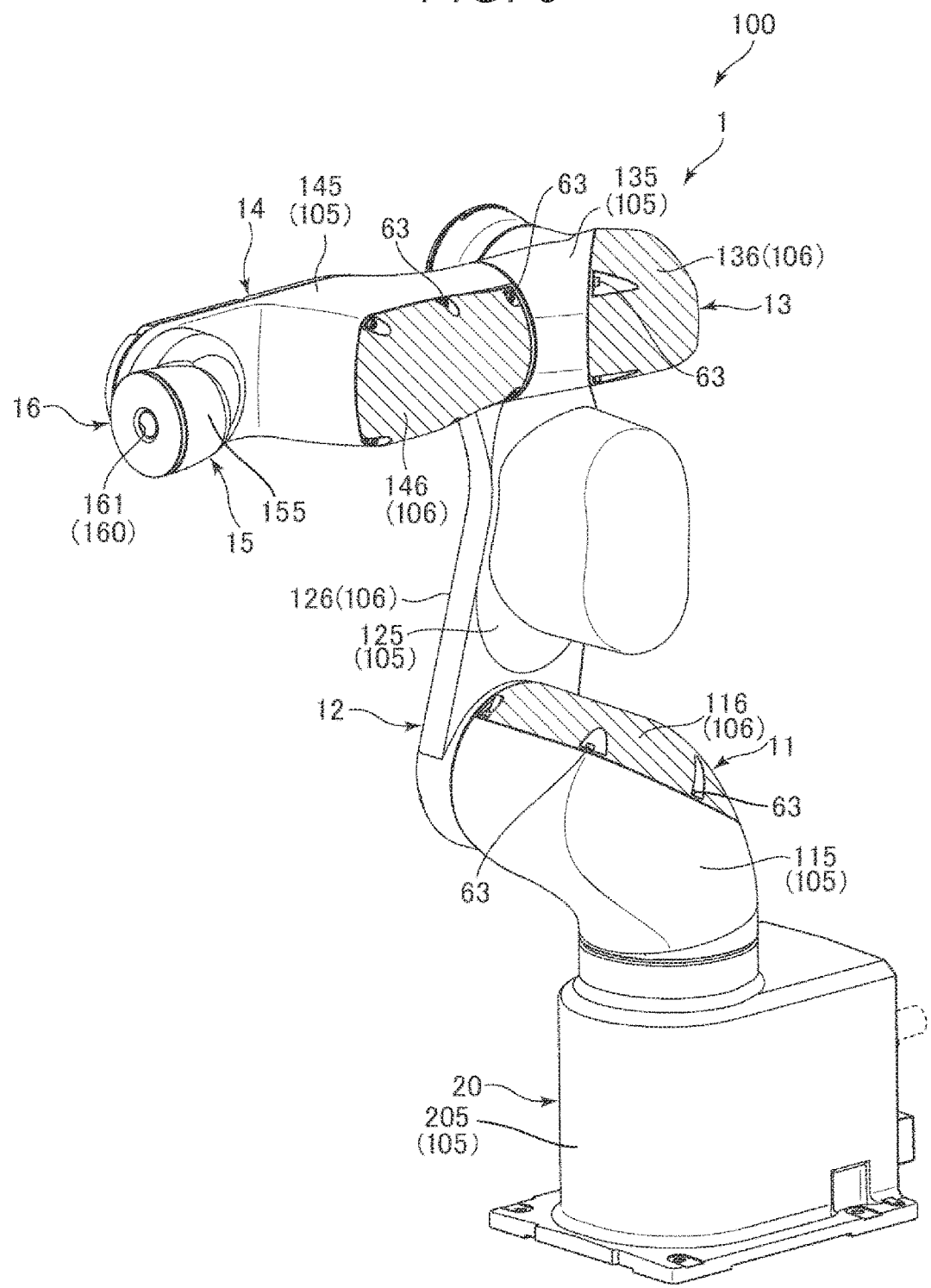
FIG. 9 is another diagram for explaining the plurality of housings and covers included in the robot.
Figure 10:
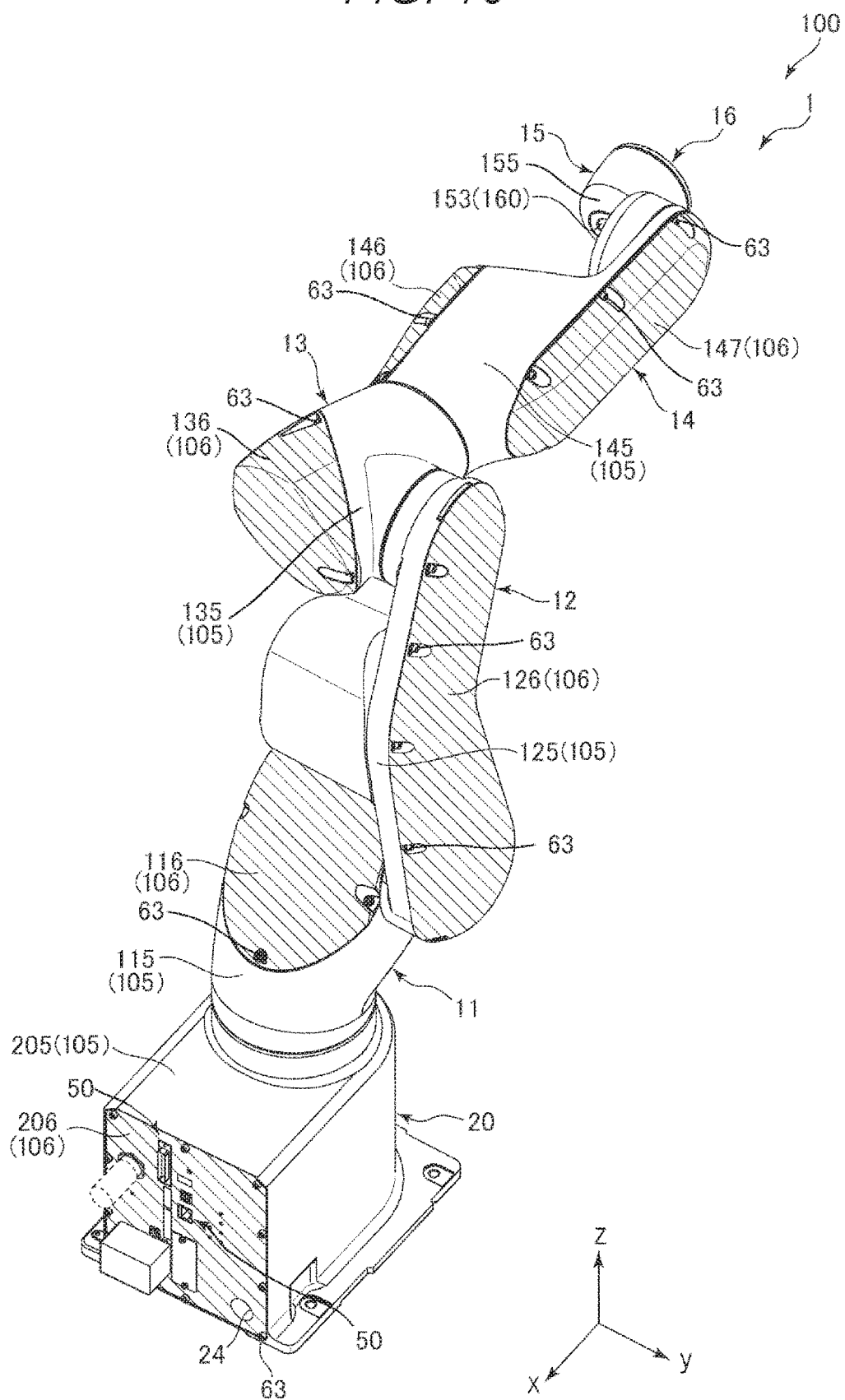
FIG. 10 is a diagram for explaining a plurality of housings and covers included in the robot and a suction hole provided in a base.
Figure 11:
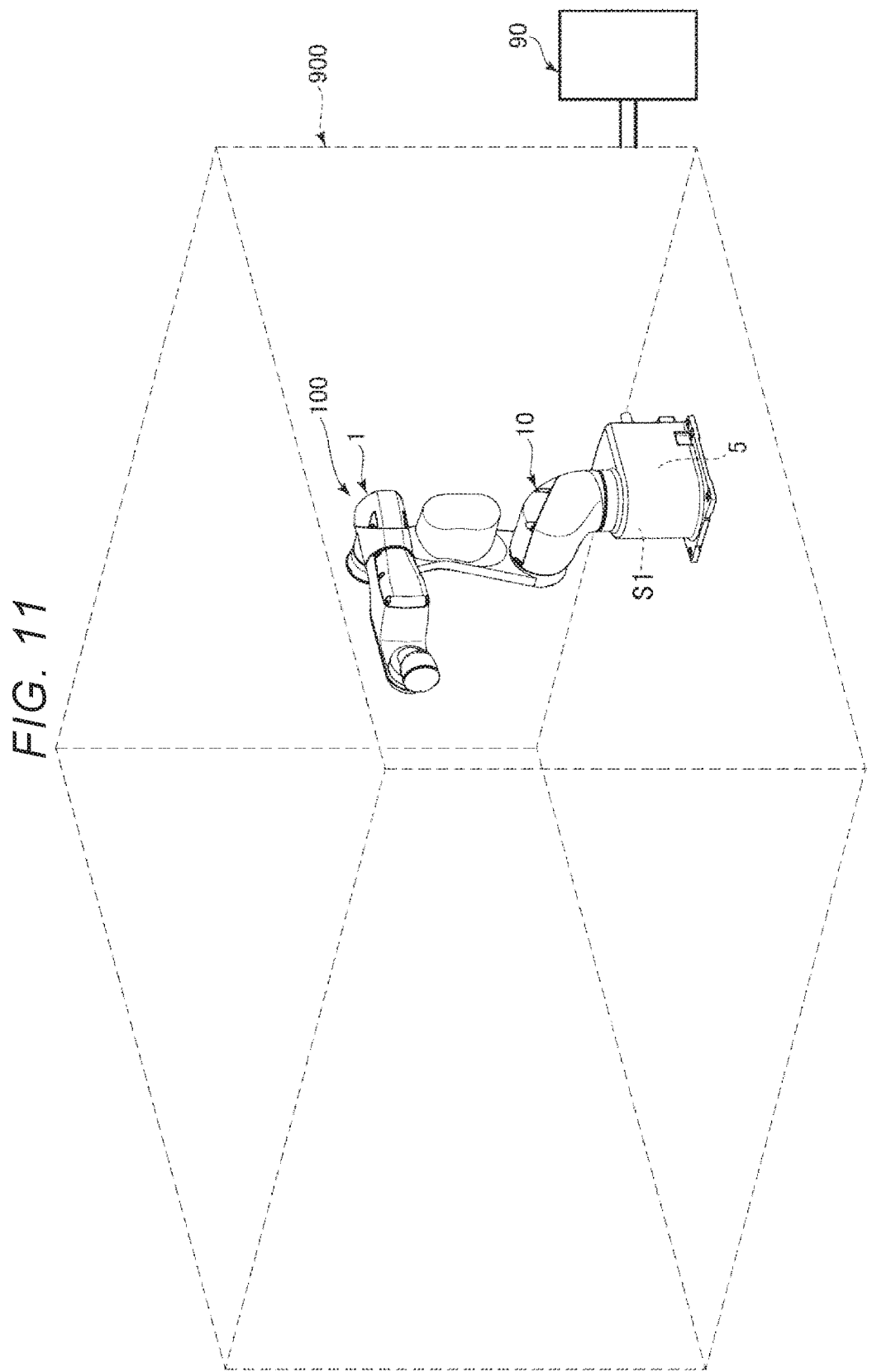
FIG. 11 is a diagram schematically illustrating a robot installed in a clean room.
Figure 12:
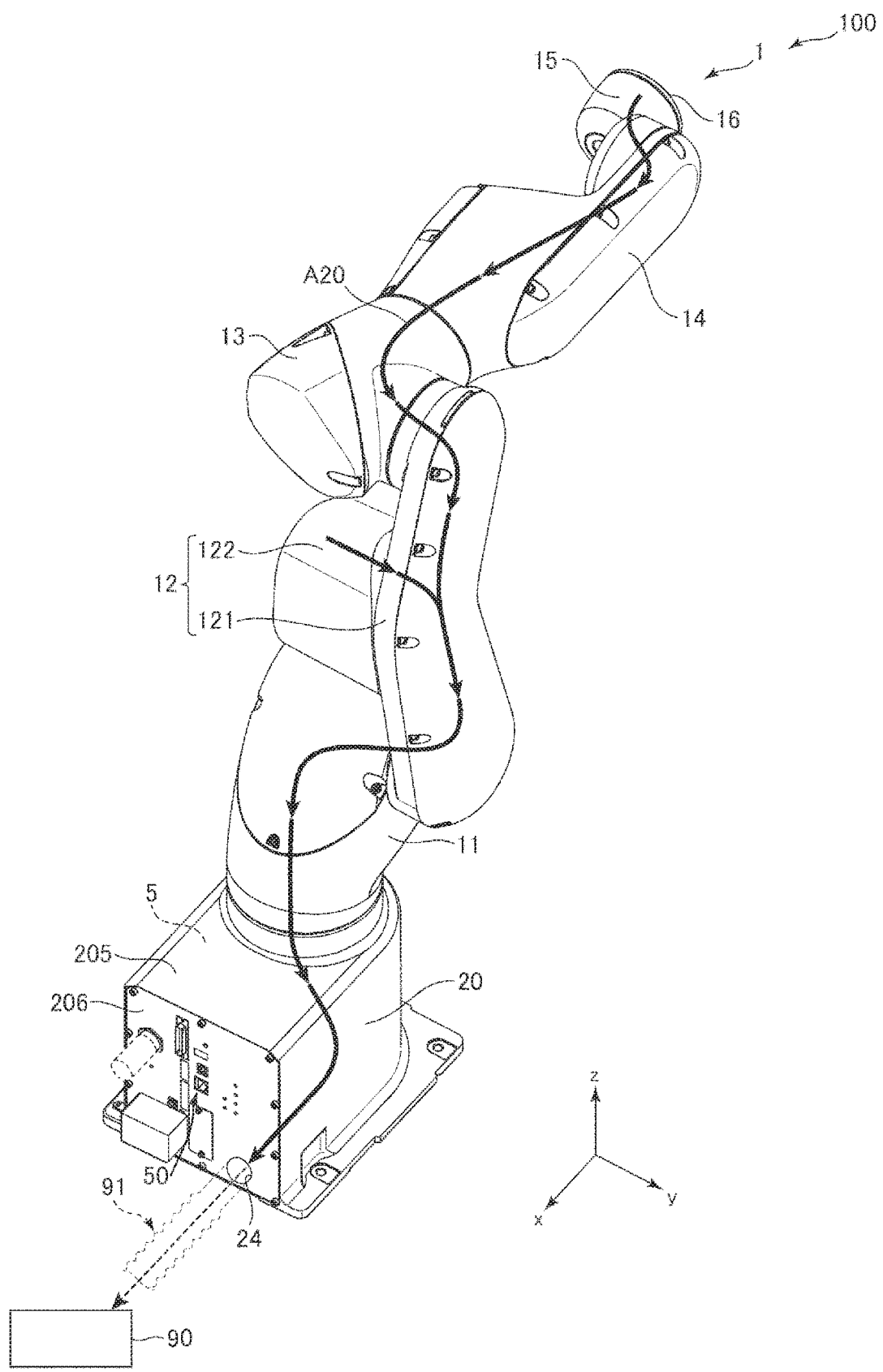
FIG. 12 is a diagram illustrating a flow of gas in the internal space.

FIG. 9 is another diagram for explaining the plurality of housings and covers included in the robot. FIG. 10 is a diagram for explaining a plurality of housings and covers included in the robot and a suction hole provided in abase. FIG. 11 is a diagram schematically illustrating a robot installed in a clean room. FIG. 12 is a diagram illustrating a flow of gas in the internal space.

Next, the exterior members (the housing 105, the cover 106, and the like) of the robot main body 1 and the suction hole 24 will be described (see FIGS. 9 and 10). The robot 100 can suck (discharge to outside) gas (air) in the internal space S1 formed by the exterior members (such as the housing 105 and the cover 106) described below using the suction hole 24. With this configuration, dust and the like that may exist in the internal space S1 together with air in the internal space S1 can be sucked to the outside. For that reason, the robot 100 can be appropriately used in an environment of high cleanliness such as, for example, a clean room 900 (see FIG. 11). The robot can be particularly appropriately used under the environment of the cleanliness class of Class 3 or more based on the international unified standard (ISO) 14644-1: 2015.

Exterior Member

The robot main body 1 is configured to include a plurality of exterior members (housing 105, cover 106, and the like). Specifically, as illustrated in FIGS. 9 and 10, each the base 20 and the arms 11 to 14 includes the housing 105 and the cover 106, and the arm 15 includes a case 155. More specifically, the base 20 includes a housing 205 and a cover 206. The arm 11 includes a housing 115 and a cover 116. The arm 12 includes a housing 125 and a cover 126. The arm 13 includes a housing 135 and a cover 136. The arm 14 includes a housing 145, a cover 146, and a cover 147. The arm 15 includes a case 155. In the following description, the housing 205, when the housing 115, the housing 125, the housing 135, and the housing 145 are not distinguished from each other, these housings are respectively referred to as the housing 105. Further, when the cover 206, the cover 116, the cover 126, the cover 136, the cover 146 and the cover 147 are not distinguished from each other, these housings are referred to as the cover 106.

The outer shape of the housing 205 of the base 20 is substantially rectangular parallelepiped. On the other hand, the outer shape of the cover 206 is a rectangular flat plate shape. The +x axis side and the +z axis side of the housing 205 are open, respectively, and the +x axis side opening of the housing 205 is closed by the cover 206. For example, the cover 206 is screwed to the housing 205 by screws.

The housing 115 of the arm 11 opens to the base end (−z axis side) thereof and the +z axis side and the +y axis side of the tip end portion thereof. The housing 115 is disposed in a state in which an edge portion forming the opening (−z axis side opening) of its base end portion is joined to an edge portion forming the +z-axis side opening of the housing 205.

The +x axis side opening of the front end portion of the housing 115 is closed by the cover 116. For example, the cover 116 is screwed to the housing 115 by the screws.

The housing 125 of the arm 12 is positioned on the −y axis side with respect to the cover 126, and mainly forms a portion on the −y axis side of the flat portion 121 and the protruding portion 122. On the other hand, the cover 126 is positioned on the +y axis side with respect to the housing 125, and mainly forms a portion on the +y axis side of the flat portion 121. The housing 125 opens to the −y axis side of the base end portion, the −y axis side of the tip end portion, and the whole area on the +y axis side. The housing 125 is disposed in a state in which an edge portion forming a −y axis side opening of the base end portion thereof is joined to an edge portion forming the +y axis side opening of the tip end portion of the housing 115. Further, the +y axis side opening of the housing 125 is closed by the cover 126. In the first embodiment, the cover 126 is screwed to the housing 125 by the screws.

The housing 135 of the arm 13 opens to the base end portion (+y axis side), the tip end portion (−x axis side), and the +x axis side of the intermediate portion. The housing 135 is disposed in a state where an edge portion forming the opening (+y axis side opening) of the base end portion thereof is joined to an edge portion forming the −y axis side opening of the tip end portion of the housing 125. The +x axis side opening of the intermediate portion of the housing 135 is closed by the cover 136. In the first embodiment, the cover 136 is screwed to the housing 135 by the screws 63.

The housing 145 of the arm 14 forms most of the base end side portion 141 and most of the tip end side portion 142. On the other hand, the cover 146 forms the remaining portion of the base end side portion 141, and the cover 147 forms the remainder of the tip end side portion 142. Further, the housing 145 opens to the base end portion (+x axis side) thereof, the −y axis side in the base end side portion 141, and almost the whole area on the +y axis side. The housing 145 is disposed in a state in which an edge portion forming the opening (+x axis side opening) of the base end portion thereof is joined to an edge portion forming the tip end side opening (−x axis side opening) of the housing 135. Further, the −y axis side opening in the base end side portion 141 of the housing 145 is closed by the cover 146. In the first embodiment, the cover 146 is screwed to the housing 145 by the screws 63, and is fixedly connected to the housing 145. Similarly, the cover 147 is screwed to the housing 145 by the screws 63.

The case 155 of the arm 15 forms the whole are of exterior of the arm 15, and opens to the base end portion (+y axis side) thereof and the tip end portion (−x axis side) thereof. The case 155 is disposed in a state in which the edge portion forming the opening (+y axis side opening) of the base end portion thereof is joined to the edge portion forming the front end side opening (−y axis side opening) of the housing 145. The disk-shaped arm 16 is rotatably connected to the edge portion which forms opening (−x axis side opening) of the tip end portion of the case 155.

As described above, the robot 100 includes the plurality of housings 105, the plurality of covers 106, and the case 155. With such a plurality of exterior members, the internal space S1 is formed.

In the first embodiment, each of the arms 11 to 14 is configured to include the housing 105 (first member) and the cover 106 (second member), but the invention is not limited to thereto. Each of all of the arms 11 to 16 may be configured to include the housing 105 (first member) and the cover 106 (second member), and at least one of the arms 11 to 16 may be configured to include the housing 105 (first member) and the cover 106 (second member). Further, in the first embodiment, the base 20 and the robot arm 10 are configured to include the plurality of housings 105 (first members) and the plurality of covers 106 (second members), but the invention is not limited thereto. For example, the base 20 and the robot arm 10 may be configured to include one housing 105 (first member) and one cover 106 (second member). For example, the housings 115, 125, 135, and 145 constituting the respective arms 11 to 14 may be integrated. In the preset specification, each of the first member and the second member refers to a member (that is, a member constituting exterior of the robot main body 1) that forms the internal space S1.

Further, the housing 105 and the cover 106 may be connected via a sealing member (not illustrated) such as a packing.

Suction Hole

As illustrated in FIG. 10, the cover 206 included in the base 20 is provided with a suction hole 24 for sucking gas in the internal space S1. In the first embodiment, the suction hole 24 is provided in a portion on the −z axis side of the cover 206. The suction hole 24 is formed to have such a size that a duct hose 91 (piping) connected to a dust collector 90 (suction device) provided outside the clean room 900 can be inserted (see FIGS. 11 and 12).

According to the robot 100 having such a suction hole 24, the duct hose 91 is inserted into the suction hole 24 so as make it possible to easily discharge gas (air in the first embodiment) existing in the internal space S1. For that reason, as illustrated in FIG. 11, even if the robot 100 is disposed in the clean room 900 and driven, it is possible to reduce or prevent the discharge of dust and heat generated inside the robot 100 into the clean room 900.

As described above, the robot 100 includes the robot main body 1 that includes the base 20 and the robot arm 10 connected to the base 20, the drive unit 30 (a plurality of in the first embodiment) that is provided inside (internal space S1) the robot main body 1 and drives the robot arm 10, the control board 51 that is provided inside the robot main body 1, the power supply board 52 that supplies electric power to the control board 51, and the drive board 53 (a plurality of in the first embodiment) that drives the drive unit 30 based on a command from the control board 51. Further, the robot main body 1 includes the suction hole 24 (hole) from which the duct hose 91 (piping) to which the dust collector 90 (suction device) for sucking gas inside the robot main body 1 is connected is detachable.

According to such a robot 100, the duct hose 91 is inserted into the suction hole 24 to suck, for example, gas (air) in the internal space S1 with the dust collector 90 so as to make it possible to easily discharge dust existing inside the internal space S1 together with the air in the internal space S1 to the outside of the clean room 900. For example, as illustrated in FIG. 12, air in the internal space S1 moves along the arrow A20 direction, is discharged from the suction hole 24 to the duct hose 91 (outside the robot 100), and collected in the dust collector 90. By doing as described above, gas in the internal space S1 is sucked. Further, pressure in the internal space S1 can be lowered by sucking the gas in the internal space S1 and thus, heat generated by driving the robot 100 can be easily discharged. Thus, the robot 100 can be appropriately used in an environment with high cleanliness, for example, the clean room 900. The robot 100 can be particularly appropriately used under the environment of the cleanliness class of Class 3 or more based on the international unified standard (ISO) 14644-1: 2015. According to such a robot 100, there is no need to prepare large-scale capital investment for measures against heat exhaust and dust generation, and it is possible to drive the robot 100 stably for a long time in the clean room 900.

Although not illustrated, the suction hole 24 may be configured so that an opening area thereof can be adjusted. For example, although not illustrated, an edge portion forming the suction hole 24 may be configured so that a jig or the like for adjusting the opening area of the suction hole 24 can be connected. Further, a cylindrical flange (not illustrated) including a cavity communicating with the suction hole 24 may be attached to the cover 206 so as to protrude from the cover 206 toward the outside.

Further, although not illustrated, in a case where the duct hose or the like is not inserted into the suction hole 24, that is, in a case where the suction hole 24 is not used, an edge portion forming the suction hole 24 may be formed so that a component (not illustrated) for closing the opening of the suction hole 24 can be disposed.

The method of sucking gas in the internal space S1 using the suction holes 24 may be other than a method using the duct hose 91 and the dust collector 90.

In the first embodiment, the suction hole 24 is provided in the portion of the cover 206 on the −z axis side, but the position of the suction hole 24 is not limited to the illustrated position but is arbitrary. For example, the suction hole 24 may be formed in the housing 205, or the suction hole 24 may be formed in the robot arm 10. However, as described above, it is preferable that the suction hole 24 is preferably provided in the base 20. That is, the base 20 preferably includes the suction hole 24 (hole).

With this configuration, dust in the internal space S1 can be efficiently discharged. In the case where the robot 100 is installed so that the base 20 is positioned lower than the robot arm 10 in the vertical direction, since the suction hole 24 is provided in the base 20, dust in the internal space S1 can be discharged particularly efficiently.

Furthermore, as in the first embodiment, it is preferable that the control board 51 and the power supply board 52 are provided in the base 20 and the base 20 is provided with the suction hole 24. With this configuration, heat generated from the control board 51 and the power supply board 52 can be efficiently eliminated and accordingly, the robot 100 can be more stably driven in the clean room 900 for a longer period of time.

In the first embodiment, as described above, the cover 206 is provided with the suction hole 24. With this configuration, it is easy to form the suction hole 24, and maintenance of the suction hole 24 is easy.

Further, as described above, the robot main body 1 is configured to include metal. The metal is preferably grounded.

With this configuration, it easy to take measures against static electricity of the robot main body 1 and accordingly, it is possible to reduce or prevent adhesion of dust and the charged foreign matter and the like to the robot main body 1.

In particular, in the first embodiment, each of the arms 11 to 16 is mainly made of metal. With this configuration, the effect described above can be exerted particularly remarkably. Further, in the first embodiment, each of the arms 11 to 16 is made of aluminum. As a result, the effect described above can be remarkably exerted, and weight of the robot arm 10 can be reduced.

The robot main body 1 may be configured to include, for example, a resin material or the like from the viewpoint of weight reduction.

As described above, the arm 12 is cantilevered by the arm 11, and the arm 15 is cantilevered by the arm 14. With this configuration, it is possible to reduce the volume inside the robot main body 1 compared with the case where the arm 12 and the arm 14 are supported at both ends and thus, it is possible to more appropriately and easily carry out the dust generation measures using the suction holes 24.

As described above, since the control board 51 and the power supply board 52 are accommodated in the internal space S1, the control board 51 having the controller function and the power supply board 52 and the robot main body 1 are integrated and thus, it is easy to take measures against heat exhaust and measures for dust generation as compared with the case where the controller and the robot main body 1 are separate bodies.

Further, since a plurality of driving boards 53 and a plurality of drive units 30 are provided dispersedly in the robot arm 10, it is possible to reduce thermal runaway and it is easier to take measures against heat exhaust using the suction hole 24. Accordingly, it is possible to reduce the load applied to the clean room 900 due to heat generated by driving of the robot 100, and to stably drive the robot 100 in the clean room 900 for a longer period of time.

In particular, as described above, since the first drive unit 31 and the first drive board 531 are provided in the arm 11 instead of the base 20, the first drive unit 31 and the first drive board 531 can be separated from the control board 51 and the power supply board 52 provided in the base 20. For that reason, the effects described above can be exhibited particularly remarkably.

The robot 100 according to the embodiment has been described as above. The robot 100 having the configuration as described above has a fan-less structure. That is, the robot main body 1 is not provided with a fan for generating airflow in the internal space S1.

With this configuration, measures against dust generation are particularly easy. As described above, the power supply board 52 includes a converter (not illustrated) that converts power into a DC voltage of 20 V (relatively low drive voltage) and outputs the drive voltage to each drive board or the like, thereby capable of realizing a fan-less structure.

The robot 100 may include a fan (not illustrated). In that case, it is preferable to provide a member (such as a heat exchanger) having the function of absorbing or discharging heat generated from the robot 100 to the robot 100. However, as described above, when the robot 100 has a fan-less structure, it is possible to save time and effort for separately providing a member such as a heat exchanger. In addition, the robot 100 having the fan-less structure can be appropriately used even in an environment with higher cleanliness.

Although the robot of the invention has been described as above based on the illustrated embodiment, the invention is not limited to thereto, and the configuration of each portion can be replaced with any configuration having the same function. Further, any other constituent element may be added to the invention.

In the embodiment described above, a single arm robot is exemplified as the robot of the invention, but the robot is not limited to the single arm robot, but may be another robot such as a dual arm robot, for example. That is, two or more robot arms may be provided to the base.

The entire disclosure of Japanese Patent Application No. 2017-192215, filed Sep. 29, 2017, is expressly incorporated by reference herein.

What is claimed is:

1. A robot comprising:
a robot main body that includes a base and a robot arm connected to the base, the base including a base housing defining a base internal space and the robot arm including a robot arm housing defining a robot arm internal space;
a motor that is provided in the robot arm internal space and drives the robot arm;
a control board that is provided in the base internal space;
a power supply board that is provided in the base internal space and supplies electric power to the control board; and
a drive board that is provided in the base internal space or in the robot arm internal space and drives the motor based on a command from the control board,
wherein the robot main body includes a single aperture providing communication between the robot arm internal space and the base internal space and an atmosphere, the simple aperture being a suction hole,
wherein the suction hole is defined by the base housing and is configured to receive a pipe, the pipe being connected to a suction device for sucking gas inside the robot main body, the pipe being detachable from the suction hole, and
the base internal space is connected to the robot arm internal space such that gas inside the robot arm internal space is sucked through the base and through the suction hole in the base.

2. The robot according to claim 1,
wherein the robot main body is configured to include metal, and
the metal is grounded.

3. The robot according to claim 1,
wherein the robot arm includes an A-arm and a B-arm that is cantilevered by the A-arm.

4. The robot according to claim 1,
wherein the robot arm includes a first arm that is connected to the base and that rotates with respect to the base, and
the motor includes a first motor that is provided in the first arm and drives the first arm.

5. The robot according to claim 4,
wherein the robot arm includes a second arm that is connected to the first arm and that rotates with respect to the first arm, and
the motor includes a second motor that is provided in the second arm and drives the second arm.

6. The robot according to claim 5,
wherein the drive board includes a first drive board that is provided in the first arm and drives the first motor and a second drive board that is provided in the second arm and drives the second motor.

7. The robot according to claim 1,
wherein the control board is provided in the base.

8. The robot according to claim 1,
wherein the power supply board is provided in the base.

9. The robot according to claim 1,
wherein a fan is not provided in the robot main body.

* * * * *